(12) United States Patent
Gonzalez et al.

(10) Patent No.: US 9,241,192 B2
(45) Date of Patent: Jan. 19, 2016

(54) POLICY DECISION POINT OVERRIDE FOR CONTENT RATING

(75) Inventors: Francisco Gonzalez, Atlanta, GA (US); Muhammad Asif Raza, McDonough, GA (US)

(73) Assignee: Cox Communications, Inc., Atlanta, GA (US)

(*) Notice: Subject to any disclaimer, the term of this patent is extended or adjusted under 35 U.S.C. 154(b) by 13 days.

(21) Appl. No.: 13/028,240

(22) Filed: Feb. 16, 2011

(65) Prior Publication Data

US 2012/0210342 A1  Aug. 16, 2012

(51) Int. Cl.
*H04N 21/475* (2011.01)
*H04N 21/45* (2011.01)
*H04N 21/454* (2011.01)
*H04N 21/84* (2011.01)

(52) U.S. Cl.
CPC ....... *H04N 21/4756* (2013.01); *H04N 21/4532* (2013.01); *H04N 21/4542* (2013.01); *H04N 21/84* (2013.01)

(58) Field of Classification Search
CPC ...................................................... H04N 7/163

USPC ........................................................ 725/25, 28
See application file for complete search history.

(56) References Cited

U.S. PATENT DOCUMENTS

| | | | |
|---|---|---|---|
| 2005/0028191 A1* | 2/2005 | Sullivan et al. | 725/28 |
| 2007/0214473 A1* | 9/2007 | Barton et al. | 725/28 |
| 2008/0172689 A1* | 7/2008 | Feder et al. | 725/28 |
| 2008/0244637 A1* | 10/2008 | Candelore | 725/28 |
| 2009/0178094 A1* | 7/2009 | Thomas et al. | 725/109 |

* cited by examiner

*Primary Examiner* — Jefferey Harold
*Assistant Examiner* — Justin Sanders
(74) *Attorney, Agent, or Firm* — Merchant & Gould P.C.

(57) ABSTRACT

A policy decision point override for content rating. Parental controls may be modified at a decision point. A content rating decision point includes memory configured for maintaining content metadata, wherein the memory includes a first field for storing a content provider assigned rating and a second field for storing a locally generated content rating for each of a plurality of content. A processor is coupled to the memory to receive input from a subscriber defining a locally generated content rating for rating presentation and rating-based control of content.

27 Claims, 5 Drawing Sheets

POLICY DECISION POINT OVERRIDE FOR CONTENT RATING

FIELD OF THE INVENTION

This disclosure relates in general to, and more particularly to a local decision point in the home where subscribers may override the content provider's parental rating for blocking presentation of the media program.

BACKGROUND OF THE INVENTION

Motion picture, television and video content are often times rated with a parental control rating that is usually set by a rating authority based on pre-defined criteria. For example, a cartoon could be rated for G (general pubic) or a horror movie would be rated R (Restricted) due to horror and explicit content. However, the underlying potential issue is that these rating systems are based on a pre-defined one size fits all criteria which may or may not be appropriate based on cultural, religious or political background etc. Therefore, if a parent has set a general rule to allow PG-13 content in the home then there is still a potential that children will be exposed to content that may be deem as inappropriate by the parent.

In today's ever changing world of content delivery, content can also arrive from various sources. This makes parental control difficult because there is no method to keep track of the nature of the content. Content can be sourced from a variety of content providers including film studios, content aggregators like HBO, and even from individual users streamed over the Internet etc. This situation is exacerbated as more and more over the top user generated content finds its way into the home. This kind of content usually has not been properly rated, if rated at all.

Currently, content providers use a policy decision point to assign a rating code to a particular piece of content. The policy enforcement point (PEP) in a cable set-top box is typically the CableCARD and/or user interface/program guide. The PEP examines the rating information contained in the program stream and compares it to the rating threshold contained in the general policy as set by the parent.

However, there is a need for a method and system for allowing parental controls and/or ratings to be modified or added to the content at a decision point, such as in the consumer's home.

SUMMARY OF THE INVENTION

To overcome the limitations described above, and to overcome other limitations that will become apparent upon reading and understanding the present specification, embodiments for a policy decision point override for content rating are disclosed.

The above-described problems are solved by allowing parental controls to be modified and/or added to the content at a decision point in the consumer's home. This empowers the consumer to take more control of what kind of content is being distributed and viewed within the network. The policy decision point override addresses at least two issues. First, consumer may modify the parental rating. Further, a rating may be added to the content if a rating has not previously been added, e.g., in the original content.

An embodiment includes a content rating decision point. The content rating decision point includes memory configured for maintaining content metadata, wherein the memory includes a first field for storing a content provider assigned rating and a second field for storing a locally generated content rating for each of a plurality of content and a processor, coupled to the memory, for receiving input from a subscriber defining a locally generated content rating for rating presentation and rating-based control of content.

In another embodiment, a system for providing rating override for rating content is provided. The system includes a distribution backend for receiving content from content providers and for transmitting the received content to subscribers, a plurality of set-top boxes (STBs), coupled to the distribution backend, the plurality of set-top boxes presenting a program guide to subscribers, wherein the program guide displaying tuning information and content metadata associated with the tuning information including a first rating associated with the content, the first rating provided by the content provider, wherein the plurality of STBs further include memory configured for maintaining the content metadata, a receiving device, coupled to each of the plurality of set-top boxes, the receiving device including a display for displaying content and for displaying the program guide including the tuning information and memory for storing content metadata associated with the tuning information, wherein the receiving device includes a rating user interface for accepting a locally generated content rating added to the content metadata as a local rating to create modified content metadata; and a personalized rating repository for storing the modified content metadata including the local rating, the modified content metadata maintained in storage of the personalized rating repository having a first field for storing a content provider assigned rating and a second field for storing a locally generated content rating for each of a plurality of content, wherein the receiving device further includes a processor, coupled to the memory, for implementing the locally generated content rating in the modified content metadata and for rating presentation and rating-based control of content based on the locally generated content rating.

In another embodiment, a memory configured for maintaining content metadata is disclosed. The memory includes a first portion for providing a field for storing a content provider assigned rating associated with content and a second portion for providing a second field for storing a locally generated content rating for the content, wherein the content provider assigned rating is static and the locally generated content rating is modifiable by a content subscriber, the locally generated content rating is given preference over the content provider assigned rating to provide local override of content rating to control accessibility of the content.

In another embodiment, a method for providing local override of content rating is disclosed. The method include setting a locally generated rating for the content by a subscriber, receiving, at a subscriber receiving device, content from a content provider, parsing metadata associated with the received content at the subscriber receiving device to determine a rating set by the content provider, comparing the rating set by the content provider to the locally generated rating set by the subscriber and modifying the content to reflect the locally generated rating set by the subscriber when the rating set by the content provider and the locally generated rating set by the subscriber are not the same.

In another embodiment, a computer readable medium including executable instructions which, when executed by a processor, provides local override of content rating is disclosed. The executable instructions provides local override of content rating by setting a locally generated rating for the content by a subscriber, receiving, at a subscriber receiving device, content from a content provider, parsing metadata associated with the received content at the subscriber receiving device to determine a rating set by the content provider, comparing the rating set by the content provider to the locally generated rating set by the subscriber and modifying the content to reflect the locally generated rating set by the subscriber when the rating set by the content provider and the locally generated rating set by the subscriber are not the same.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to a secondary policy decision point allowing modifications and/or additions to the rating information on a granular basis. A secondary policy decision point may be used by subscribers to enhance the level of control based on a local rating set by the subscriber. A personalized method to control the types of content being allowed to be watched is provided. In the case of the rated content, the metadata will be modified per user preference. The metadata file structure according to an embodiment accommodates this type of change.

Figure 1:
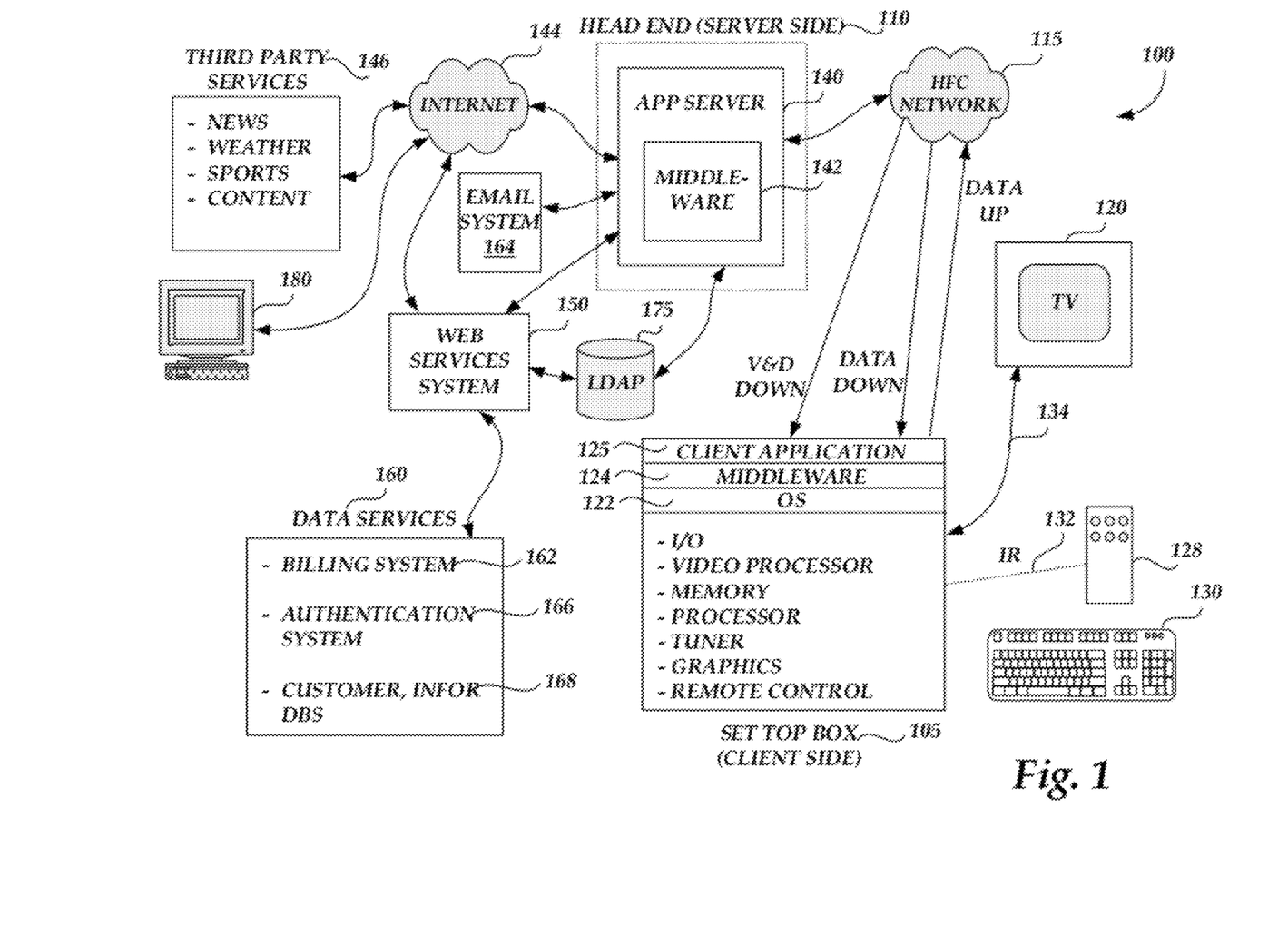
FIG. 1 is a simplified block diagram illustrating a cable television/services system (hereafter referred to as "CATV") architecture that serves as an example of an operating environment for the present invention according to one embodiment.

FIG. 1 is a simplified block diagram illustrating a cable television/services system 100 (hereafter referred to as "CATV") architecture that serves as an exemplary operating environment for the present invention according to one embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 125 and operating systems 122 that allow the client applications to communicate with the operating systems through common data calls understood via the API set. As described below, a corresponding middleware layer 142 is included on the server side of the CATV system 100 for facilitating communication between the server-side application server 140 and the client-side STB 105. According to one embodiment of the present invention, the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 144 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

An electronic mail system 164 may contain information such as electronic mail addresses, high-speed Internet access subscription information and electronic mail usage data. An authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
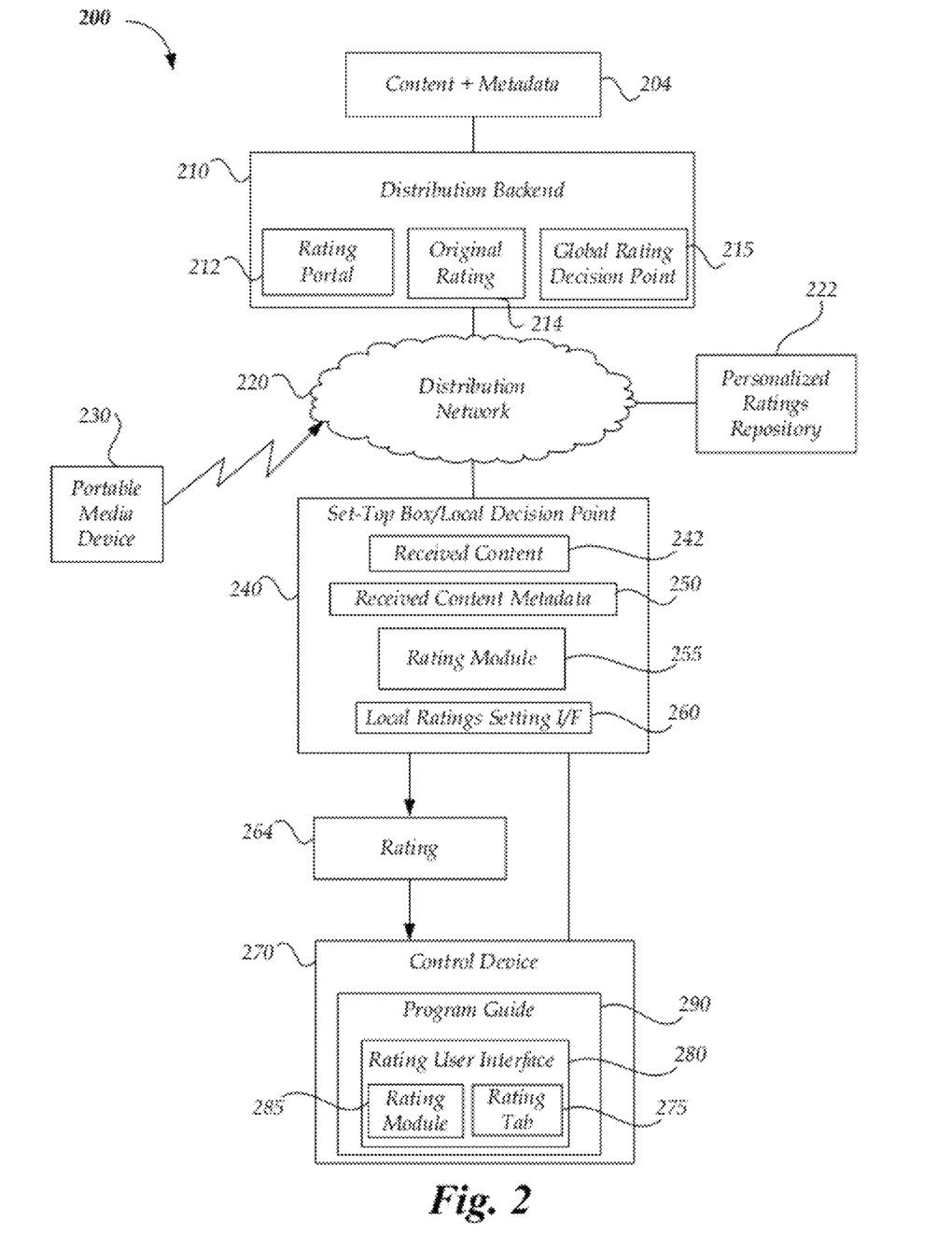
FIG. 2 shows a block diagram of the rating override method architecture as it can be applied to a modern CATV system according to one embodiment.

FIG. 2 shows a block diagram of the architecture for providing rating override 200 according to one embodiment. FIG. 2 shows a rating override architecture 200 according to an embodiment as implemented for a modern CATV system. FIG. 2 illustrates both the Set-Top Box (STB) 240 and distribution backend 210 being used as secondary decision points where subscribers can override guide provider supplied ratings of content. Those skilled in the art will recognize that secondary decision points may be implemented in additional locations according to an embodiment.

In FIG. 2, content and metadata 204 are provided to the distribution backend 210. The distribution backend 210 is coupled to a distribution network for provided received content 242 to a set-top box/local decision point 240. The set-top box 240 is configured to act as a local decision point for rating control. The received content 242 may be stored or buffered in the STB 240. When the STB 240 acts as a local decision point, the subscriber may override the ratings provided by the content metadata 250. Subscribers who want to globally enable portable media devices 230 and receiving devices/control devices 270 to view and input via multiple rating user interfaces will require a global rating decision point 215 implemented in the distribution backend 210. The distribution backend 210 may also include a rating portal 212 that enables a portable media device 230 to access the global rating decision point 215 in the distribution backend 210. A portable media device 230 accesses the global rating decision point 215 by accessing the rating portal 212 through the distribution network 220. The distribution network 220 may include a hybrid fiber coax system, the Internet, an RF transmission network and/or other network configured to provide communication between at least set-top boxes 240 and portable media devices 230. The global rating decision point 215 is configured to receive global rating overrides provided by a subscriber using a portable media device 230 or sent from the set-top box 240.

A personalized rating repository 222 is coupled to the distribution network. The personalized rating repository 222 may includes a server running a database management system. The personalized rating repository 222 maintains modified content ratings provided by subscribers that may be pushed to all users or to a single user through the distribution network 220. A core identity that is associated with a subscriber may also be maintained at the personalized rating repository 222. The personalized rating repository 222 may thus provide the modified rating to the set-top box 240, which then provides the rating 264 to a viewing device. The viewing device may be provided by the control device 270 or may be implemented by a television, computer, or other type or receiving device.

Using a control device 270, such as mobile phone, an electronics remote control device, etc., subscribers may view rating information provided via a program guide 290 using a rating user interface 280 on the control device 270. After viewing the rating tab 275 within the rating user interface 280, the subscriber may modify the rating information associated with content, associated with a particular channel, etc. Therefore, a local policy decision point is created in the home by allowing the parent, via a rating module 255 at the local decision point 240, to modify or add rating information, e.g., on a per-program basis. This policy decision point override system 200 will allow the parent to change the rating for content with a new local rating setting that may be maintain by the local rating setting interface 260. The subscriber accesses a rating user interface 280 from, for example, the program guide 290. The subscriber may access the rating user interface 280 prior to the program airing, on-the-fly as the program plays out in real-time, and/or at any later time should the program be recorded or time shifted in any way. Thus, the user may modify the rating associated with content more or less restrictive based on a preference of the subscriber. For example, a PG-13 rated content could be modified to have a local rating of R to be more restrictive or could be modified to have a local rating of G to make the content less restrictive. The local policy override setting loaded into the local rating setting interface 260 by the subscriber may be applied to a certain channel or may be implemented on content basis while keeping the integrity of original rating.

Figure 3:
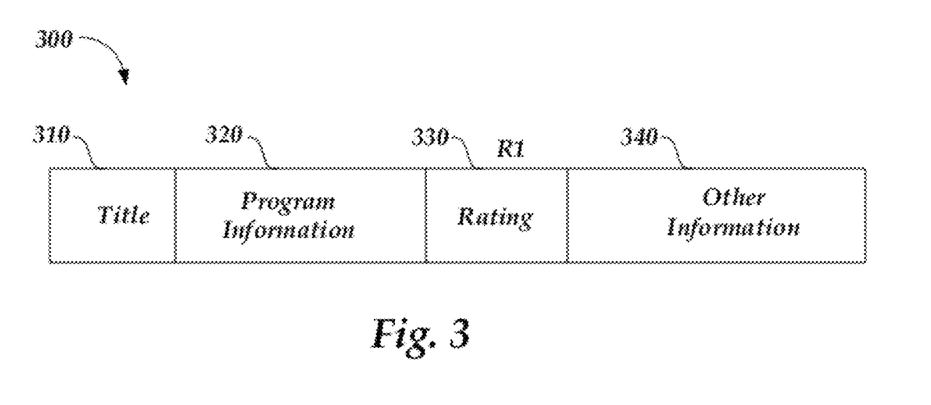
FIG. 3 illustrates a metadata structure for content providing a first rating code assigned by a content provider according to one embodiment.

FIG. 3 illustrates a metadata structure 300 for content providing a first rating code assigned by a content provider. The metadata structure 300 includes a title 310 for the content. For example, movies, TV shows and other media content include metadata that is useful for browsing media files. The title of the content may be provided in the title field 310. An image may also be included in the title 310 field to identified the content visually. A program information field 320 may be included. Program information field 320 may be used to provide a brief description of a movie, an episode of a TV program, etc. The program information metadata field 320 may be default metadata or may be customized metadata. According to one embodiment, the program information metadata field 320 may be modified by the user. For example, the program information may be modified to provide a more detailed description or to include certain words selected for certain searches for program information metadata field 320.

The metadata structure 300 may also include a rating field 330. The rating field 330 provides a code or classification to alert consumers whether particular attention should be given to the work's suitability for audience members, e.g., below a particular age level. For example, in the U.S., the Motion Picture Association of America decides ratings to used in the U.S. and its territories. The British Board of Film Classification (BBFC) responsible for the national classification of films within the United Kingdom. Eirin is the abbreviated name for Eiga Rinri Kanri Iinkai, which is Japan's movie regulator. However, the ratings applied by these and other ratings regulators are not consistent. As a result, the ranges applied to suitability of content varies across the different rating regulators. An additional information field 340 may also be applied. The additional information may include any data that is not related to the title, program information or rating. Examples may include the release date, identification of actors, producers, etc.

Figure 4:
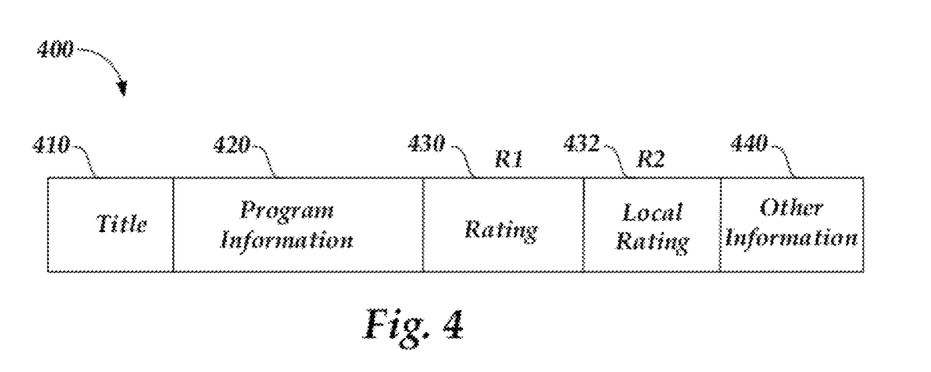
FIG. 4 illustrates a metadata structure for content providing a rating code assigned by a content provider and a local rating code assigned by the subscriber according to an embodiment of the invention.

FIG. 4 illustrates a metadata structure 400 for content providing a rating code assigned by a content provider and a local rating code assigned by the subscriber according to an embodiment of the invention. To enable a rating override at a policy decision point according to an embodiment, the metadata structure may be modified to include a local rating. The metadata structure 400 includes a title 410 for the content, program information 420, a rating code, R1, for the content that is assigned by the content provider 430, and a field for providing additional information 440. To enable policy decision point override for content rating, the metadata structure also includes a local rating, R2, assigned by the subscriber 432. R2 will always have a higher priority relative to R1. Therefore, the locally generated parental control rating, R2, 432, is given preference over the ratings sent in original metadata, i.e., R1 430. In the case of where the content has not been locally rated, then R1 will be applied. In the case of an unrated content, the metadata will be modified to include a local rating, R2 432, using the user interface so that local ratings will be applied to the content.

In the case of transporting the content outside of the network, the R2 field 432 will be completely removed from the metadata and will be transported with original integrity and guide rating, R1 430. This is to ensure that the receiving device with same user interface have to use, or even become aware of, the local customized rating, R2 432, from another user. The concept of local ratings is only applicable to devices in the user's virtual usage domain. Any content transmitted outside of that domain will be transmitted with the same rating information, R1 430 that was in the original metadata, thereby preserving the integrity of the original metadata. This allows the sharing of content without superseding the rating intent of the content provider.

Figure 5:
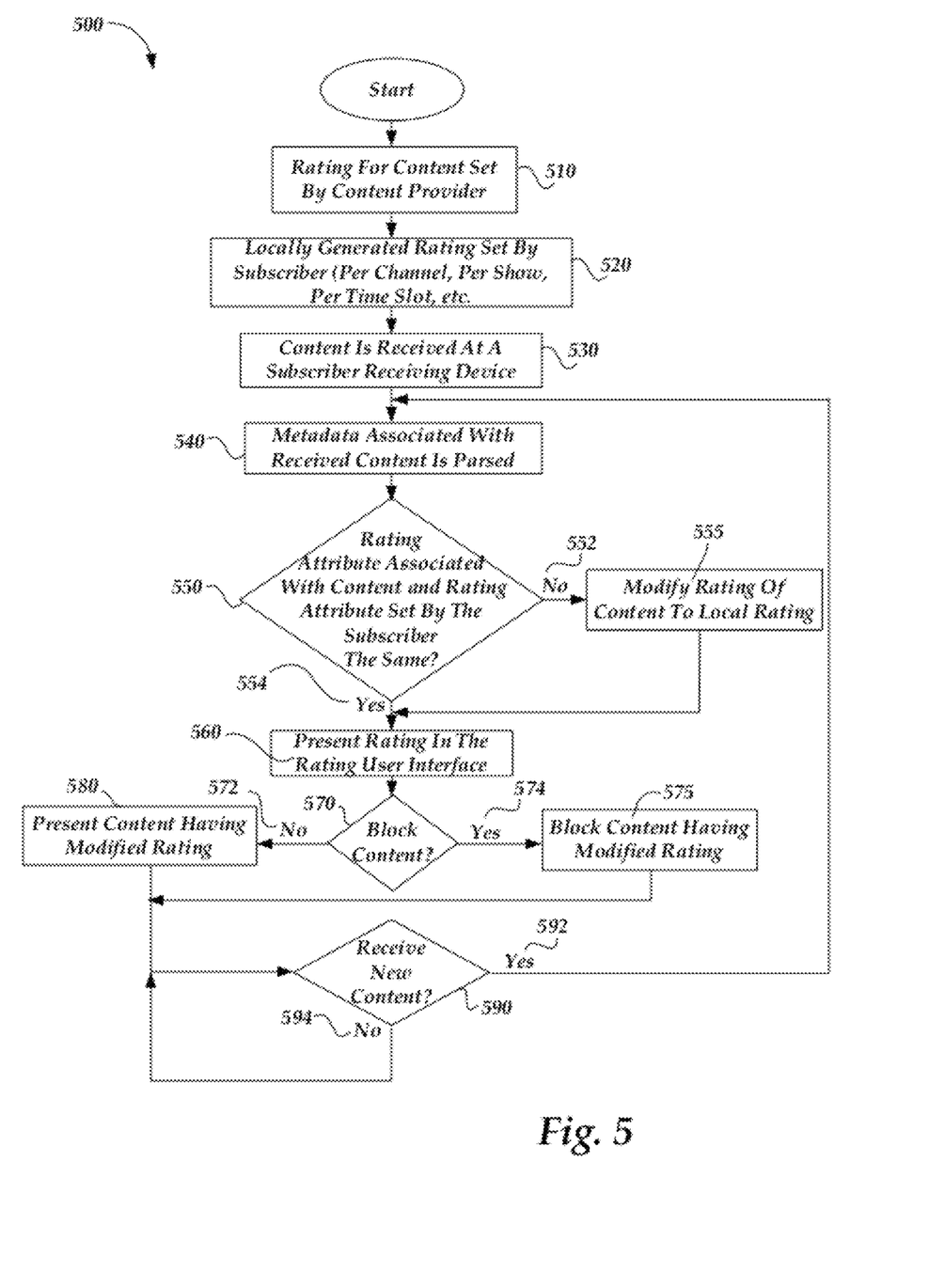
FIG. 5 is a flowchart illustrating a software algorithm of the rating module that is in the user interface according to one embodiment.

FIG. 5 is a flowchart 500 illustrating a software algorithm of the rating module that is in the user interface according to one embodiment. The rating for the content is set by the content provider 510. The local ratings are set by the subscriber 520. For example, the local rating may be set per channel or per show. The locally generated rating is set by the subscriber using the rating module in a user receiving device. The locally generated rating is provided to the set-top box (STB). Content is received at a subscriber receiving device 530 and the STB parses the metadata associated with the incoming content 540.

The STB compares the rating attribute set by the content provider to the locally generated rating set by the subscriber 550. If the rating is not the same 552, the content is modified to reflect the locally generated rating set by the subscriber 555. If the rating is the same 554, or after the content is modified to reflect the locally generated rating set by the subscriber 555, the rating is presented in the user interface along with other information about the content 560. Based on the rating presented in the user interface, the user makes a decision whether to block the media content 570. If the decision is to block the media content 574, the media content is blocked 575. If the decision is to present the media content 572, the media content is presented 580. The STB monitors for the receipt of new content 590. If new content is received 592, the process repeats 594. Otherwise, the process sleeps until new content is received 596.

Figure 6:
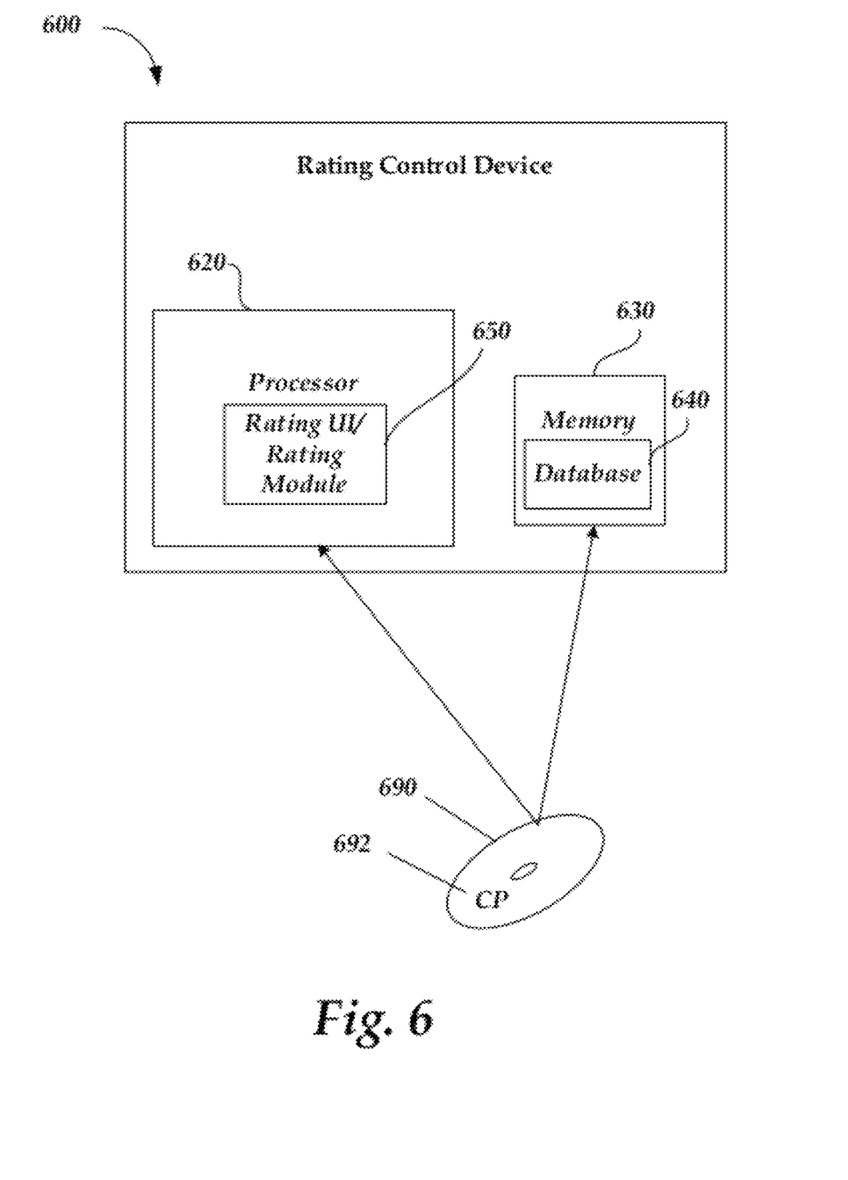
FIG. 6 illustrates a suitable computing environment for implementing a system as described above in FIGS. 1-5 according to one embodiment.

FIG. 6 illustrates a suitable computing environment 600 for implementing a secondary policy decision point for providing a rating override as described above in FIGS. 1-5 according to one embodiment. In FIG. 6, a rating control device 600 includes a processor 620 and memory 630. Those skilled in the art will recognize that a rating control device 600 may be implemented in a head end module, a subscriber receiving device, such as a set-top box, an interactive TV, a portable media device, etc., and other data/content receiving/control devices. Embodiments may also be implemented in combination with other types of computer systems and program modules. Generally, program modules include routines, programs, components, data structures, and other types of structures that perform particular tasks or implement particular abstract data types. By way of example, computer readable media 690 can include computer storage media or other tangible media. Computer storage media 690 includes volatile and nonvolatile, removable and non-removable media implemented in any method or technology for storage of information 692, such as computer readable instructions, data structures, program modules or other data. Moreover, those skilled in the art will appreciate that the invention may be practiced with other computer system configurations, including handheld devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 690 may refer to a mass storage device, such as a hard disk or CD-ROM drive. However, it should be appreciated by those skilled in the art that tangible computer-readable media can be any available media that can be accessed or utilized by a processing device, e.g., server or communications network provider infrastructure.

By way of example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 620 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 630 thus may store the computer-executable instructions that, when executed by processor 620, cause the processor 620 to implement a rating user interface (UI)/rating module 650 according to an embodiment as described above with reference to FIGS. 1-5. However, memory 630 may also be configured to provide the database 640 for storing metadata including ratings and other content associated data, programs, as well as other content, which is processed by processor 620.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A content rating decision point, comprising:
memory configured for maintaining a content metadata structure of a content instance, wherein the metadata structure includes a first field for storing a content provider assigned rating including a rating code and a second field for storing a locally generated content rating such as a locally generated content rating code, the locally generated content rating code in the second field being more restrictive or less restrictive than the rating code in the first field, the locally generated content rating code having priority over the content provider assigned rating code for the content instance; and
a processor, coupled to the memory, for receiving input from a subscriber defining the locally generated content rating code in the second field for rating presentation, for utilizing both rating codes in the first and second fields of the metadata structure of the content instance in a comparison for determining rating-based control of the content instance, and for maintaining in the memory the rating code in the first field of the content metadata structure along with the rating code in the second field of the content metadata structure; wherein during the comparison if the rating codes are the same, then the rating code of the content provider is utilized for determining if the content instance should be blocked and if the rating codes are not the same, then the locally generated rating code is utilized for determining if the content instance should be blocked.

2. The content rating decision point of claim 1, wherein the processor receiving the input from the subscriber defining the locally generated content rating for a selected one of the plurality of content, the processor storing the received locally generated content rating associated with the selected one of the plurality of content in the second field, and wherein the locally generated rating associated with the selected one of the plurality of content in the second field is given preference over the content provider assigned rating for the rating presentation and the rating-based control of the selected one of the plurality of content.

3. The content rating decision point of claim 1, wherein the processor is provided in a set-top box.

4. The content rating decision point of claim 1, wherein the processor is provided in a distribution backend device providing a secondary decision point.

5. The content rating decision point of claim 4, wherein the processor in the distribution backend device is configured to support globally enable content devices to enable mobile local rating control.

6. The content rating decision point of claim 1, wherein the processor is configured to receive the locally generated content rating for a selected one of the plurality of content to enable the subscriber to modify the locally generated content rating for the selected one of the plurality of content.

7. The content rating decision point of claim 6, wherein the processor is configured to modify the locally generated content rating for the selected one of the plurality of content on a per-program basis.

8. The content rating decision point of claim 6, wherein the processor is configured to modify the locally generated content rating based on signals received from a program guide presented to the subscriber.

9. The content rating decision point of claim 6, wherein the processor is configured to modify the locally generated content rating prior to an air time of the selected one of the plurality of content.

10. The content rating decision point of claim 6, wherein the processor is configured to modify the locally generated content rating on-the-fly as the selected one of the plurality of content is presented in real-time.

11. The content rating decision point of claim 6, wherein the processor is configured to modify the locally generated content rating at any time after the selected one of the plurality of content is recorded.

12. The content rating decision point of claim 1, wherein the processor is configured to modify the locally generated content rating for content associated with a channel selected by the subscriber.

13. A system for providing rating override for rating content, comprising:
a distribution backend for receiving content instances from content providers and for transmitting the content instances to subscribers;
a plurality of set-top boxes (STBs), coupled to the distribution backend, the plurality of set-top boxes presenting a program guide to the subscribers, wherein the program guide displaying tuning information and content metadata associated with the tuning information including a first rating having a first rating code associated with each of the content instances, the first rating codes provided by the content provider, wherein the plurality of STBs further include memory configured for maintaining a content metadata structure for each content instance, each content metadata structure comprising the first rating code in a first field and a second rating code generated locally by one of the subscribers in a second field;
a receiving device, coupled to each of the plurality of STBs, the receiving device including a display for displaying content and for displaying the program guide including the tuning information and a memory for storing the content metadata structure of each content instance associated with the tuning information, wherein the receiving device includes a rating user interface for accepting the locally generated content rating codes added to the content metadata structures, the locally generated content rating codes in the second fields being more restrictive or less restrictive than the rating codes in the first fields, the locally generated content rating codes having priority over the rating codes in the first fields provided by the content provider; and
a personalized rating repository for storing the modified content metadata including the local rating, the modified content metadata maintained in storage of the personalized rating repository having a first field for storing a content provider assigned rating and a second field for storing the locally generated content rating for each of a plurality of content;
wherein the receiving device further includes a processor, coupled to the memory, for implementing the locally generated content rating codes in the second fields, for utilizing both rating codes in the first and second fields of the metadata structures of the content instances in comparisons for determining for rating-based control of each content instance based on the locally generated content rating codes, and for maintaining in the memory the rating code in the first field of the metadata structure along with the rating code in the second field of the metadata structure for each content instance, and wherein during the comparisons if the rating codes are the same, then the rating code of the content provider is utilized for determining if the content instance should be blocked and if the rating codes are not the same, then the locally generated rating code is utilized for determining if the content instance should be blocked.

14. The system of claim 13, wherein the processor stores the received locally generated content rating associated with a selected one of the plurality of content in the second field, and wherein the locally generated rating associated with the selected one of the plurality of content in the second field is given preference over the content provider assigned rating for the rating presentation and the rating-based control of the selected one of the plurality of content.

15. The system of claim 13, wherein the processor is configured to receive the locally generated content rating for a selected one of the plurality of content to enable the subscriber to modify the locally generated content rating for the selected one of the plurality of content.

16. The system of claim 15, wherein the processor is configured to modify the locally generated content rating on a per-program basis.

17. The system of claim 15, wherein the processor is configured to modify the locally generated content rating based on signals received from a program guide presented to the subscriber.

18. The system of claim 15, wherein the processor is configured to modify the locally generated content rating prior to an air time of the selected one of the plurality of content.

19. The system of claim 15, wherein the processor is configured to modify the locally generated content rating on-the-fly as the selected one of the plurality of content is presented in real-time.

20. The system of claim 15, wherein the processor is configured to modify the locally generated content rating at any time after the selected one of the plurality of content is recorded.

21. The system of claim 13, wherein the processor is configured to modify the locally generated content rating for content associated with a channel selected by the subscriber.

22. The system of claim 13, wherein the locally generated content rating is removed and the rating in the content provider assigned rating is controlling when the content is transported outside a network of the subscriber.

23. The system of claim 13, wherein the distribution backend includes a rating portal for providing an externally accessible gateway for setting a global rating override and a global rating decision point for receiving the global rating override via the rating portal, the rating portal replacing the local rating with the global rating override.

24. A memory configured for maintaining content metadata structure for a content instance, comprising:
a first portion for providing a field for storing a content provider assigned rating including a rating code associated with the content instance; and
a second portion for providing a second field for storing a locally generated content rating code for the content, the locally generated content rating code in the second portion being more restrictive or less restrictive than the rating code in the first portion, the locally generated content rating code in the second portion having priority over the content provider assigned rating code in the first portion for the content instance;
wherein the content provider assigned rating code in the first portion is static and the locally generated content rating code in the second portion is modifiable by a content subscriber, the locally generated content rating code is compared with the content provider assigned rating code for determining rating-based control of the content instance, and the content provider assigned rating code is maintained in the first portion of the content metadata structure rating code along with the locally generated content rating code in the second portion to control accessibility of the content instance, and wherein the during the comparison if the rating codes are the same, then the rating code of the content provider is utilized for determining if the content instance should be blocked and if the rating codes are not the same, then the locally generated rating code is utilized for determining if the content instance should be blocked.

25. The memory of claim 24 further comprising:
a third portion for providing a third field for storing a title for the content instance, wherein the third field for storing the title includes an image to identify the content instance visually; and
a fourth portion for providing a program information field for storing a description of the content instance, the program information field being modifiable by the content subscriber.

26. A method for providing local override of content rating, comprising:
setting a locally generated rating code for content by a subscriber;
receiving, at a subscriber receiving device, a content instance from a content provider;
parsing metadata associated with the received content instance at the subscriber receiving device to determine a rating including a rating code set by the content provider;
comparing the rating code set by the content provider to the locally generated rating code set by the subscriber, the locally generated rating code being more restrictive or less restrictive than the rating code set by the content provider, the locally generated rating code having priority over the rating code set by the content provider for the content instance;
utilizing the comparison of the rating code set by the content provider to the locally generated rating code set by the subscriber for determining rating-based control of the content instance, wherein the during the comparison if the rating codes are the same, then the rating code of the content provider is utilized for determining if the content instance should be blocked and if the rating codes are not the same, then the locally generated rating code is utilized for determining if the content instance should be blocked; and
maintaining in memory the rating code set by the content provider along with the locally generated rating code set by the subscriber.

27. A computer readable storage medium including executable instructions which, when executed by a processor, provides local override of content rating, by:
setting a locally generated rating code for content by a subscriber;
receiving, at a subscriber receiving device, a content instance from a content provider;
parsing metadata associated with the received content instance at the subscriber receiving device to determine a rating including a rating code set by the content provider;
comparing the rating code set by the content provider to the locally generated rating code set by the subscriber, the locally generated rating code being more restrictive or less restrictive than the locally generated rating code, the locally generated rating code having priority over the rating code set by the content provider for the content instance; and utilizing the comparison of the rating code set by the content provider to the locally generated rating code set by the subscriber for determining rating-based control of the content instance, wherein the during the comparison if the rating codes are the same, then the rating code set by the content provider is utilized for determining if the content instance should be blocked and if the rating codes are not the same, then the locally generated rating code is utilized for determining if the content instance should be blocked.

* * * * *